United States Patent
Forsberg et al.

(10) Patent No.: US 8,798,632 B2
(45) Date of Patent: Aug. 5, 2014

(54) METHODS, APPARATUSES, AND COMPUTER PROGRAM PRODUCTS FOR PROVIDING FRESH SECURITY CONTEXT DURING INTERSYSTEM MOBILITY

(75) Inventors: Dan Lars Anders Forsberg, Helsinki (FI); Marc Blommaert, Temse (BE); Günther Horn, München (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/997,793

(22) PCT Filed: Jun. 13, 2008

(86) PCT No.: PCT/IB2008/052351
§ 371 (c)(1),
(2), (4) Date: Dec. 13, 2010

(87) PCT Pub. No.: WO2009/150493
PCT Pub. Date: Dec. 17, 2009

(65) Prior Publication Data
US 2011/0092213 A1    Apr. 21, 2011

(51) Int. Cl.
*H04W 36/00* (2009.01)
*H04W 36/30* (2009.01)
(52) U.S. Cl.
CPC .................................. *H04W 36/30* (2013.01)
USPC ........................................ 455/439; 455/436
(58) Field of Classification Search
CPC .................................................... H04W 36/30
USPC ................................................. 455/436, 439
See application file for complete search history.

(56) References Cited

U.S. PATENT DOCUMENTS

2008/0070577 A1* 3/2008 Narayanan et al. ........... 455/436
2009/0073933 A1* 3/2009 Madour et al. ................ 370/331

FOREIGN PATENT DOCUMENTS

WO    2008/023162 A    2/2008
WO    2008/024999 A    2/2008

OTHER PUBLICATIONS

International Search Report and Written Opinion received from corresponding Patent Cooperation Treaty Application No. PCT/IB2008/052351, Feb. 26, 2009, 9 pages.
Forsberg, D., et al., "PANA Mobility Optimizations with Session Keys Context", Internet Engineering Task Force, Oct. 19, 13 pages.

* cited by examiner

*Primary Examiner* — Huy C Ho
(74) *Attorney, Agent, or Firm* — Mintz, Levin, Cohn, Ferris, Glovsky & Popeo, P.C.

(57) ABSTRACT

A method, apparatus and computer program product are provided to provide fresh security context during intersystem mobility. A method is provided which includes receiving an indication of handover of a remote device from a source system to a target system. The target system may implement a communications standard different from that of the source system. The method also includes determining a current sequence number value of a security context maintained in the source system. The method additionally includes deriving a fresh mapped security context for the target system based at least in part upon the determined sequence number value. The method further includes providing the derived fresh mapped security context to the target system.

21 Claims, 9 Drawing Sheets

METHODS, APPARATUSES, AND COMPUTER PROGRAM PRODUCTS FOR PROVIDING FRESH SECURITY CONTEXT DURING INTERSYSTEM MOBILITY

RELATED APPLICATION

This application was originally filed as PCT Application No. PCT/IB2008/052351 filed Jun. 13, 2008.

FIELD OF THE INVENTION

Embodiments of the present invention relate generally to wireless communication technology and, more particularly, relate to an apparatus, method and a computer program product for providing fresh security context during intersystem mobility.

BACKGROUND OF THE INVENTION

Current and future networking technologies continue to facilitate ease of information transfer and convenience to users. In order to provide easier or faster information transfer and convenience, telecommunication industry service providers are developing improvements to existing networks. For example, the evolved universal mobile telecommunications system (UMTS) terrestrial radio access network (E-UTRAN) is currently being developed. The E-UTRAN telecommunications standard, which is also known as Long Term Evolution (LTE) or 3.9G, is aimed at upgrading prior technologies by improving efficiency, lowering costs, improving services, making use of new spectrum opportunities, and providing better integration with other open standards.

One advantage of E-UTRAN which continues to be shared with other preceding telecommunication standards is the fact that users are enabled to access a network employing such standards while remaining mobile. Thus, for example, users having mobile terminals equipped to communicate in accordance with such standards may travel vast distances while maintaining communication with the network. In this regard, it is currently common for an access point or base station providing network coverage for a particular area (or cell), to pass off communication with a particular mobile terminal to a neighboring base station when the user of the particular mobile terminal exits the coverage area of the base station or can otherwise be more effectively served by the neighboring base station. This process is often referred to as a "handover" or "mobility event."

One lingering problem with handover in E-UTRAN and other mobile communications networks is the issue of providing fresh security context to a target system during intersystem mobility. In this regard, during handovers between neighboring base stations, a mobile terminal may traverse multiple telecommunications systems implementing different telecommunication standards. For example, even as some telecommunications systems implement E-UTRAN standards, other telecommunications systems and consequently neighboring base stations may continue to implement legacy telecommunications standards such as, for example, the universal mobile telecommunications system (UMTS) terrestrial radio access network (UTRAN) telecommunications standard and the global system for mobile communications (GSM) enhanced data rates for GSM evolution (EDGE) radio access network (GERAN) telecommunications standard.

For example, a mobile terminal may be handed over from a source radio access point or base station (referred to as an "evolved node-B" or "eNB" in E-UTRAN) to a target radio access point or base station of a target system implementing a legacy telecommunications standard, such as UTRAN or GERAN. The E-UTRAN system may maintain a cached security context for the mobile terminal, which may be accessed and used to generate a mapped security context to provide the target system. This mapped security context may comprise, for example, a cipher key and an integrity key, which may be calculated based upon a master key maintained in the cached security context by the source system and used to derive security keys used for communication with the mobile terminal. Accordingly, the mapped security context and consequently the cipher key and integrity key provided to the target system may be the same each time the mobile terminal is handed over from the E-UTRAN source system to the target system during the life of the master key maintained in the cached security context of the source system for the mobile terminal. The resulting provision of the same mapped security context to the target system if the mobile terminal is handed over back and forth between the source E-UTRAN system and the target system multiple times during the life of the master key in the cached security context maintained by the source E-UTRAN system is sometimes referred to as "key stream reuse." An exploitable security vulnerability may result from this key stream reuse.

Accordingly, it would be desirable to develop a protocol for derivation of a mapped security context from a cached security context so as to avoid key stream reuse and consequently to provide for more secure communications. It would be further desirable if the protocol did not require any modifications to the target system.

BRIEF SUMMARY OF THE INVENTION

A method, apparatus and computer program product are therefore provided that may provide a fresh security context during intersystem mobility. In this regard, embodiments of the present invention may provide a fresh security context during intersystem mobility by synchronizing a sequence number value maintained locally by both a source network element, such as, for example a general packet radio service support node (SGSN) (referred to as a "mobility management entity (MME)" in E-UTRAN), and user equipment (UE), which may be a mobile terminal, and deriving a fresh mapped security context to provide to the target system based at least in part upon the synchronized sequence number value. This fresh mapped security context may, for example, comprise a plurality of security keys, such as a cipher key and an integrity key, calculated based at least in part upon the sequence number value and a master key maintained in a cached security context for the UE. In active mode handovers, the sequence number values maintained by the UE and the source network element may be synchronized by providing an indication of the current sequence number value used by the source network element to the UE in the handover command. In idle mode mobility, the sequence number values maintained by the UE and source network element may be synchronized by the source network element calculating the UE's current sequence number value based upon a sequence number value token received in a context request message. Accordingly, by deriving a mapped security context from a synchronized sequence number value that is incremented during the life of the master key, the derived mapped security context that is provided to the target system during a handover may be fresh so as to avoid key stream reuse.

In an exemplary embodiment, a method is provided which includes receiving an indication of handover of a remote device from a source system to a target system, wherein the target system implements a communications standard different from that of the source system. The method also includes determining a current sequence number value of a security context maintained in the source system. The method additionally includes deriving a fresh mapped security context for the target system based at least in part upon the determined sequence number value. The method may further include providing the derived fresh mapped security context to the target system.

In another exemplary embodiment, a computer program product is provided. The computer program product may include at least one computer-readable storage medium, such as a memory device of a mobile terminal, having computer-readable program code portions stored therein. The computer-readable program code portions may include first, second, third, and fourth program code portions. The first program code portion is for receiving an indication of handover of a remote device from a source system to a target system, wherein the target system implements a communications standard different from that of the source system. The second program code portion is for determining a current sequence number value of a security context maintained in the source system. The third program code portion is for deriving a fresh mapped security context for the target system based at least in part upon the determined sequence number value. The fourth program code portion is for providing the derived fresh mapped security context to the target system.

In another exemplary embodiment, an apparatus is provided. The apparatus may include a processing element configured to receive an indication of handover of a remote device from a source system to a target system, wherein the target system implements a communications standard different from that of the source system. The processing element is also configured to determine a current sequence number value of a security context maintained in the source system. The processing element is further configured to derive a fresh mapped security context for the target system based at least in part upon the determined sequence number value. The processing element is additionally configured to provide the derived fresh mapped security context to the target system.

In another exemplary embodiment, an apparatus is provided. The apparatus may include means for receiving an indication of handover of a remote device from a source system to a target system, wherein the target system implements a communications standard different from that of the source system. The apparatus may additionally include means for determining a current sequence number value of a security context maintained in the source system. The apparatus may further include means for deriving a fresh mapped security context for the target system based at least in part upon the determined sequence number value. The apparatus may also include means for providing the derived fresh mapped security context to the target system.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 3:
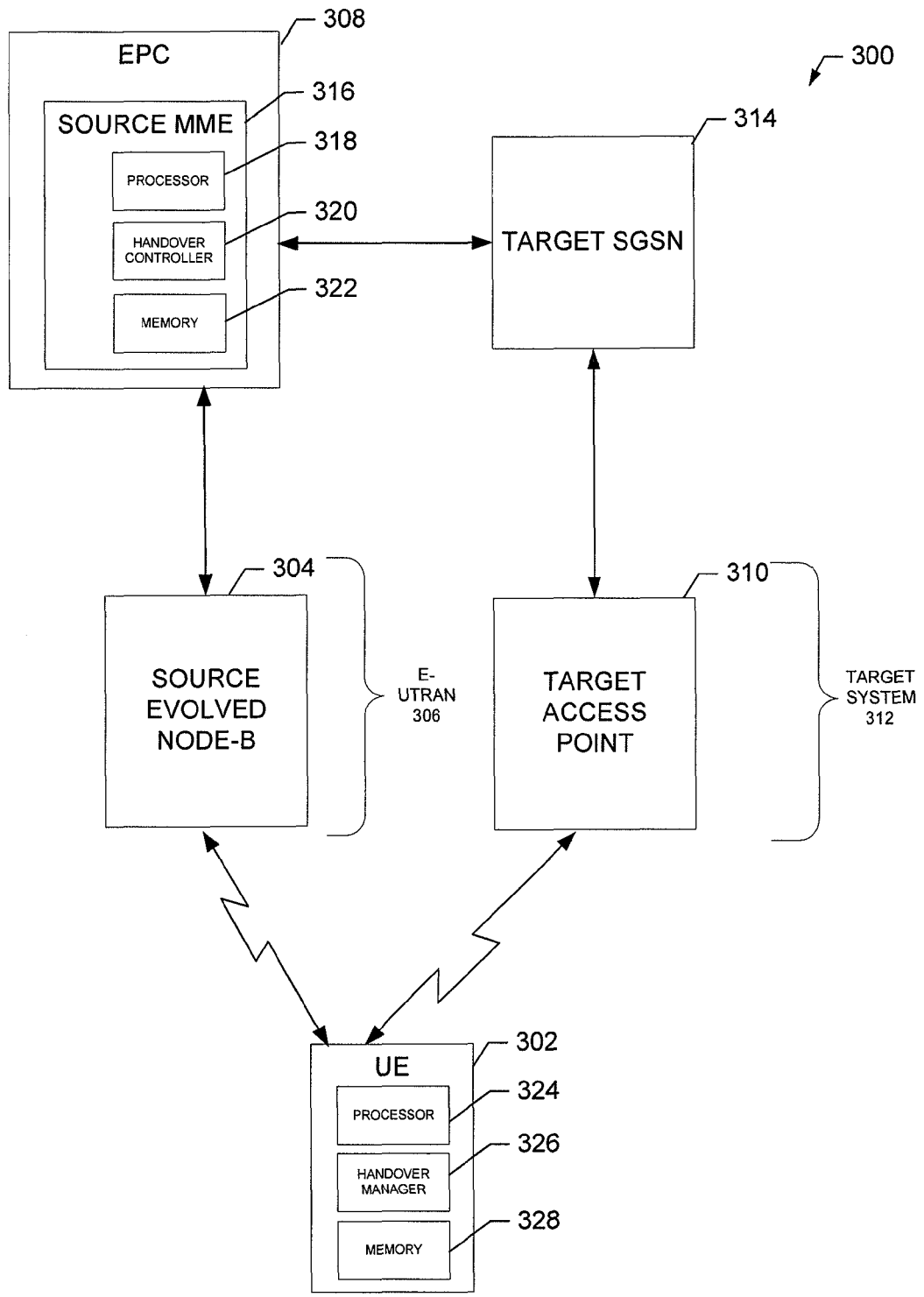
FIG. 3 is a schematic diagram showing a system for providing a fresh security context during intersystem mobility according to an exemplary embodiment of the present invention.
Figure 5:
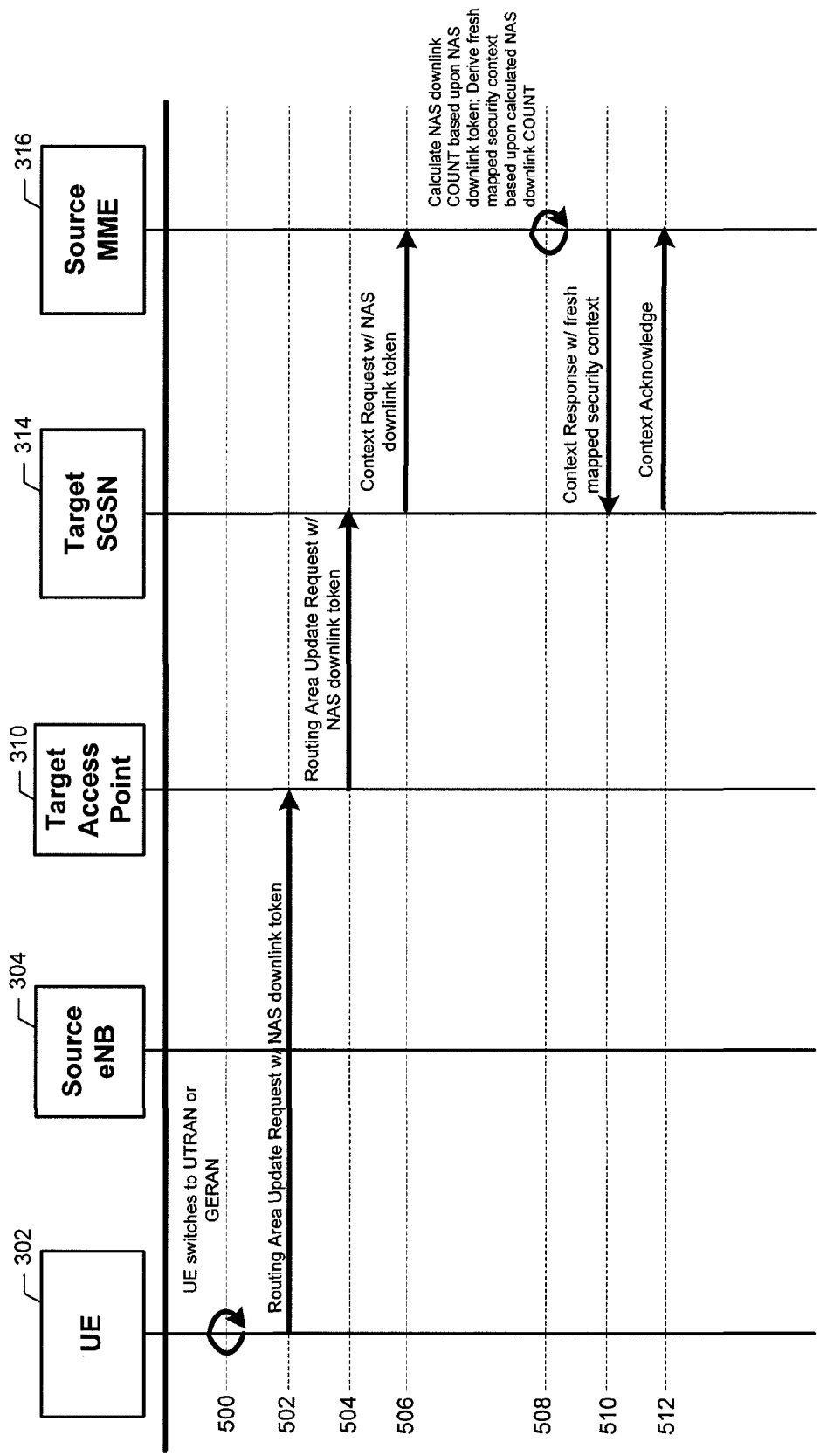

FIG. 5 is a control flow diagram of communication signals passed between entities of the exemplary embodiment of FIG. 3 during an idle mode mobility event according to an exemplary embodiment of the present invention; and FIGS. 6-9 are flowcharts according to exemplary methods for providing a fresh security context during intersystem mobility according to an exemplary embodiment of the present invention.

DETAILED DESCRIPTION OF THE INVENTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Figure 1:
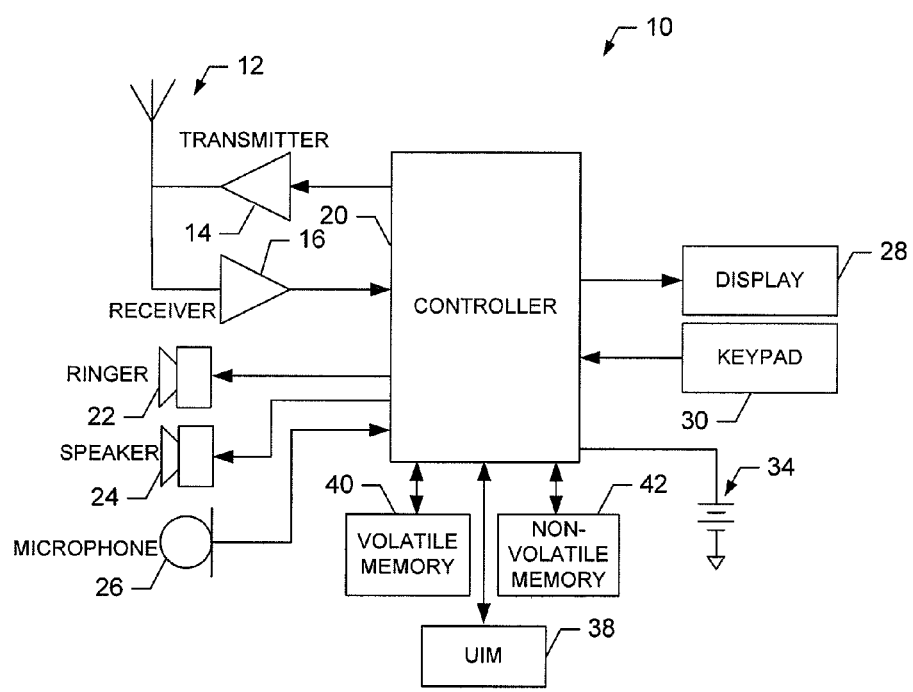
FIG. 1 is a schematic block diagram of a mobile terminal according to an exemplary embodiment of the present invention.

FIG. 1 illustrates a block diagram of a mobile terminal 10 that may benefit from embodiments of the present invention. It should be understood, however, that a mobile telephone as illustrated and hereinafter described is merely illustrative of one type of mobile terminal that may benefit from embodiments of the present invention and, therefore, should not be taken to limit the scope of embodiments of the present invention. While one embodiment of the mobile terminal 10 is illustrated and will be hereinafter described for purposes of example, other types of mobile terminals, such as mobile telephones, mobile computers, portable digital assistants (PDAs), pagers, mobile computers, mobile televisions, gaming devices, laptop computers, cameras, video recorders, GPS devices and other types of voice and text communications systems, may readily employ embodiments of the present invention.

The mobile terminal 10 may include an antenna 12 (or multiple antennae) in operable communication with a transmitter 14 and a receiver 16. The mobile terminal 10 may further include a controller 20 or other processing element that provides signals to and receives signals from the transmitter 14 and receiver 16, respectively. The signals may include signaling information in accordance with the air interface standard of the applicable cellular system, and also user speech, received data and/or user generated data. In this regard, the mobile terminal 10 may be capable of operating with one or more air interface standards, communication protocols, modulation types, and access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G) wireless communication protocols IS-136 (TDMA), GSM, and IS-95 (CDMA), or with third-generation (3G) wireless communication protocols, such as UMTS, CDMA2000, WCDMA and TD-SCDMA, LTE or E-UTRAN, with fourth-generation (4G) wireless communication protocols and/or the like.

The controller 20 may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 may further include a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 may be embodied as a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 may store information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The non-volatile memory 42 may additionally or alternatively comprise an EEPROM, flash memory or the like. The memories may store any of a number of pieces of information, and data, used by the mobile terminal 10 to implement the functions of the mobile terminal 10. For example, the memories may include an identifier, such as an international mobile equipment identification (IMEI) code, capable of uniquely identifying the mobile terminal 10.

Figure 2:
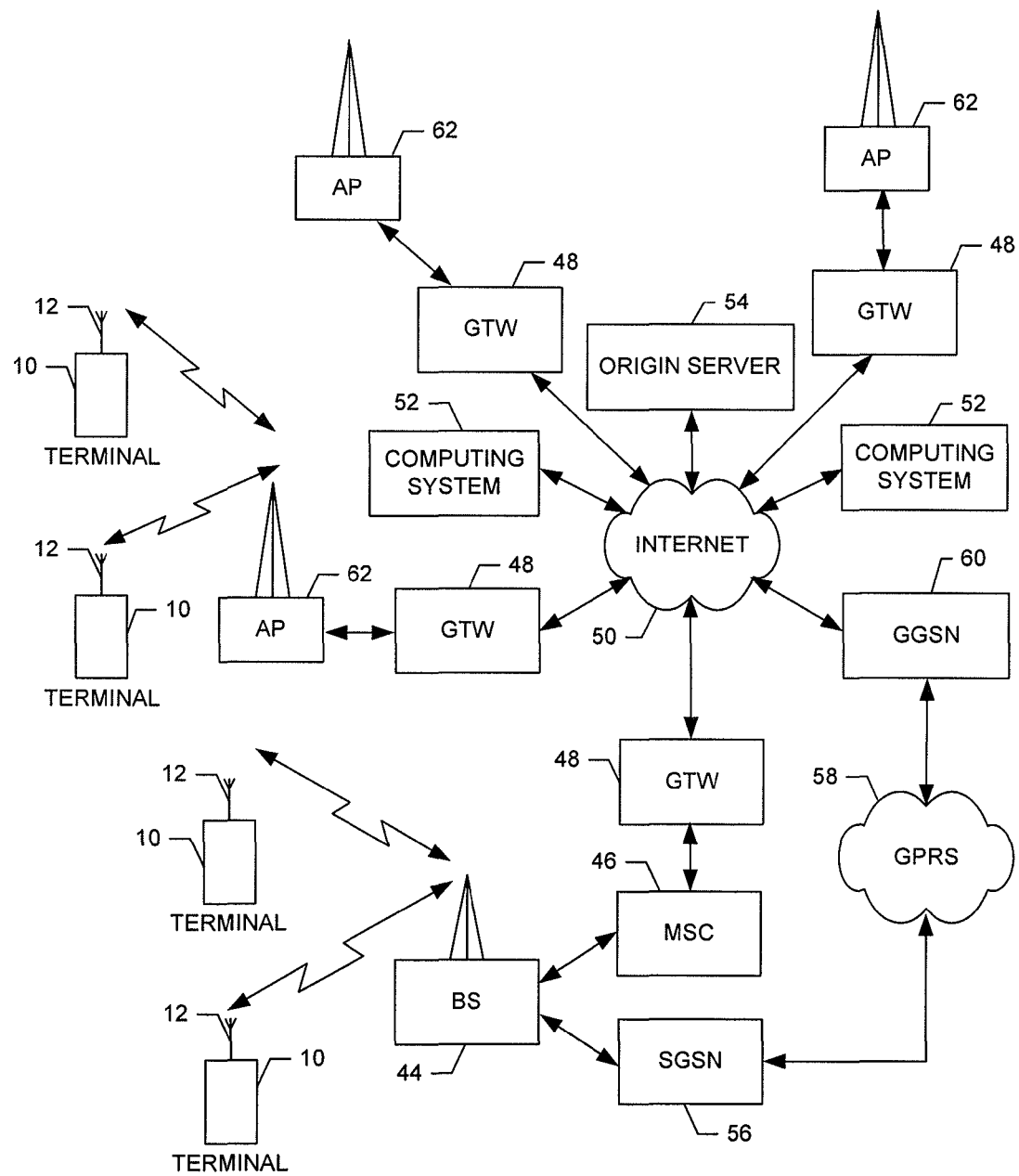
FIG. 2 is a schematic block diagram of a wireless communications system according to an exemplary embodiment of the present invention.

Referring now to FIG. 2, a schematic block diagram of one type of wireless communications system that may benefit from embodiments of the present invention is provided. One example of the system includes a plurality of network devices. As shown, one or more mobile terminals 10 may each include an antenna 12 for transmitting signals to and for receiving signals from a base site or base station (BS) 44. While a BS may be comprised of one or more cells, reference herein to a BS generically refers to both a BS and a cell of the BS. The base station 44 may be a part of one or more cellular or mobile networks each of which may include elements desirable to operate the network, such as a mobile switching center (MSC) 46. In operation, the MSC 46 is capable of routing calls to and from the mobile terminal 10 when the mobile terminal 10 is making and receiving calls. The MSC 46 may also provide a connection to landline trunks when the mobile terminal 10 is involved in a call. In addition, the MSC 46 may be capable of controlling the forwarding of messages to and from the mobile terminal 10, and may also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network or on a network employing an MSC.

The MSC 46 may be coupled to a data network, such as a local area network (LAN), a metropolitan area network (MAN), and/or a wide area network (WAN). The MSC 46 may be directly coupled to the data network. In one typical embodiment, however, the MSC 46 may be coupled to a gateway device (GTW) 48, and the GTW 48 may be coupled to a WAN, such as the Internet 50. In turn, devices such as processing elements (e.g., personal computers, server computers or the like) may be coupled to the mobile terminal 10 via the Internet 50. For example, as explained below, the processing elements may include one or more processing elements associated with a computing system 52 (two shown in FIG. 2), origin server 54 (one shown in FIG. 2) or the like, as described below.

The BS 44 may also be coupled to a serving General Packet Radio Service (GPRS) support node (SGSN) 56. As known to those skilled in the art, the SGSN 56 may be capable of performing functions similar to the MSC 46 for packet switched services. The SGSN 56, like the MSC 46, may be coupled to a data network, such as the Internet 50. The SGSN 56 may be directly coupled to the data network. Alternatively, the SGSN 56 may be coupled to a packet-switched core network, such as a GPRS core network 58. The packet-switched core network may then be coupled to another GTW 48, such as a gateway GPRS support node (GGSN) 60, and the GGSN 60 may be coupled to the Internet 50. In addition to the GGSN 60, the packet-switched core network may also be coupled to a GTW 48. Also, the GGSN 60 may be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1 G), second-generation (2G), 2.5G, third-generation (3G), 3.9G, fourth-generation (4G) mobile communication protocols or the like. For example, one or more of the network(s) may be capable of supporting communication in accordance with 2G wireless communication protocols IS-136 (TDMA), GSM, and IS-95 (CDMA). Also, for example, one or more of the network(s) may be capable of supporting communication in accordance with 2.5G wireless communication protocols GPRS, Enhanced Data GSM Environment (EDGE), or the like. Further, for example, one or more of the network(s) may be capable of supporting communication in accordance with 3G wireless communication protocols such as a Universal Mobile Telephone System (UMTS) network employing Wideband Code Division Multiple Access (WCDMA) radio access technology. Additionally, for example, one or more of the network(s) may be capable of supporting communication in accordance with 3.9G wireless communication protocols such as E-UTRAN. Some narrow-band advanced mobile phone systems (NAMPS), as well as total access communications systems (TACS), network(s) may also benefit from embodiments of the present invention, as may dual or higher mode mobile terminals (e.g., digital/analog or TDMA/CDMA/analog phones).

The mobile terminal 10 may further be coupled to one or more wireless access points (APs) 62. The APs 62 may comprise access points configured to communicate with the mobile terminal 10 in accordance with techniques such as, for example, radio frequency (RF), infrared (IrDA) or any of a number of different wireless networking techniques, including wireless LAN (WLAN) techniques such as IEEE 3162.11 (e.g., 3162.11a, 3162.11b, 3162.11g, 3162.11n, etc.), WiMAX techniques such as IEEE 3162.16, and/or wireless Personal Area Network (WPAN) techniques such as IEEE 3162.15, BlueTooth (BT), ultra wideband (UWB) and/or the like. The APs 62 may be coupled to the Internet 50. Like with the MSC 46, the APs 62 may be directly coupled to the Internet 50. In one embodiment, however, the APs 62 may be indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 may communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. One or more of the computing systems 52 may additionally, or alternatively, include a removable memory capable of storing content, which may thereafter be transferred to the mobile terminal 10. Further, the mobile terminal 10 may be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX, UWB techniques and/or the like.

In an exemplary embodiment, content or data may be communicated over the system of FIG. 2 between a mobile terminal, which may be similar to the mobile terminal 10 of FIG. 1 and a network device of the system of FIG. 2 in order to execute applications for establishing communication between the mobile terminal 10 and other mobile terminals, for example, via the system of FIG. 2. As such, it should be understood that the system of FIG. 2 need not be employed for communication between mobile terminals or between a network device and the mobile terminal, but rather FIG. 2 is merely provided for purposes of example.

An exemplary embodiment of the invention will now be described with reference to FIG. 3, in which certain elements of a system for providing a fresh security context for intersystem mobility is illustrated. As used herein, "exemplary" merely means an example and as such represents one example embodiment for the invention and should not be construed to narrow the scope or spirit of the invention in any way. It will be appreciated that the scope of the invention encompasses many potential embodiments in addition to those illustrated and described herein. The system 300 of FIG. 3 represents a specific embodiment of a network such as the general network displayed in FIG. 2, except that FIG. 3 represents a general block diagram of an E-UTRAN and a neighboring target system implementing a legacy telecommunications standard, such as, for example, UTRAN or GERAN. As such, in connection with FIG. 3, user equipment (UE) 302 may be exemplary of one embodiment of the mobile terminal 10 of FIG. 1 and source evolved node-B 304 and target access point 310 may be exemplary of embodiments of either the BS 44 or AP 62 of FIG. 2. Accordingly, although the term "evolved node-B" (also referred to as an "eNB") will be used subsequently, an evolved node-B is merely one embodiment of an access point and the term "access point" may encompass access points, base stations, and evolved node-Bs. Thus, although embodiments of the invention are discussed in relation to E-UTRAN standards, embodiments of the invention are not so limited and may be used with any communications protocol. Further, the system of FIG. 3 may also be employed in connection with a variety of other devices, both mobile and fixed, and therefore, embodiments the present invention should not be limited to application on devices such as the mobile terminal 10 of FIG. 1 or the network devices of FIG. 2.

Referring now to FIG. 3, a schematic block diagram showing a system for providing a fresh security context during intersystem mobility according to an exemplary embodiment of the present invention is provided. As used herein, "intersystem mobility" may be used interchangeably with "mobility event" and "handover" and may include both idle mode mobility events and active mode handovers. The system 300 may include an E-UTRAN 306 which may include, among other things, a plurality of evolved node-Bs, such as the source evolved node-B 304, in communication with an evolved packet core (EPC) 308 which may include one or more mobility management entities (MMEs) 316 (also referred to as a source MME 316) and one or more system architecture evolution (SAE) gateways. The evolved node-Bs (including source evolved node-B 304) may be evolved node-Bs (e.g., eNBs) and may also be in communication with the UE 302 and other UEs. The system 300 also includes a target system 312 implementing a communications standard other than E-UTRAN. The target system 312 may implement a legacy telecommunications standard such as, for example, UTRAN or GERAN. The target system 312 may include, among other things, a plurality of access points, such as the target access point 310, in communication with one or more SGSNs, such as the target SGSN 314. The target SGSN and EPC 308 may be in communication, such as by a wireline network, wireless network, or a combination thereof.

The evolved node-Bs may provide E-UTRA user plane and control plane (radio resource control (RRC)) protocol terminations for the UE 302. The evolved node-Bs may provide functionality hosting for such functions as radio resource management, radio bearer control, radio admission control, connection mobility control, dynamic allocation of resources to UEs in both uplink and downlink, selection of an MME 316 at UE attachment, IP header compression and encryption, scheduling of paging and broadcast information, routing of data, measurement and measurement reporting for configuration mobility, and the like.

The MME 316 may host functions such as distribution of messages to respective evolved node-Bs, security control, idle state mobility control, SAE bearer control, ciphering and integrity protection of non-access stratum (NAS) signaling, and the like. Although referred to herein as an "MME" in conformance with the E-UTRAN standard, it will be appreciated that embodiments of the invention are not limited to operation in accordance with the E-UTRAN standard and that the MME 316 may also be entities operable with other networking standards. In this regard, the MME 316 may be, for example, an SGSN 56 of the system of FIG. 2. The SAE gateway may host functions such as termination and switching of certain packets for paging and support of UE mobility. In an exemplary embodiment, the EPC 308 may provide connection to a network such as the Internet.

An MME 316 may include various means, such as a processor 318, handover controller 320, and memory 322, for performing the various functions described herein. The processor 318 may be embodied as any of various processing means including a processor, a coprocessor, a controller or various other processing devices including integrated circuits such as, for example, an ASIC (application specific integrated circuit), a field programmable gate array (FPGA) and/or other suitably configured or programmed hardware and/or software elements. The handover controller 320 may be any device or means embodied in either hardware, software, or a combination of hardware and software and, in one embodiment, may be embodied as or otherwise controlled by the processor 318. The handover controller 320 may be configured to communicate with evolved node-Bs and manage the handover of a UE 302. The handover controller 320 may additionally be configured to communicate with a serving SAE gateway. In this regard, the handover controller 320 may be configured to send U-Plane update requests to a serving gateway and receive U-Plane update responses from a serving gateway.

In an exemplary embodiment, the handover controller 320 may be configured to receive an indication of handover of a UE 302 from the source evolved node-B 304 to a target access point 310. In this regard, the handover controller 320 may be configured to receive an indication of an active mode handover comprising a handover required message received from a source evolved node-B 304. Based upon information and/or a parameter in the handover required message identifying the UE 302 to be handed over to a target access point 310, the handover controller 320 may be configured to retrieve a cached security context for the UE 302, which may be stored in memory 322, and determine a current sequence number value. The retrieved cached security context may be an active security context. The cached security context may include a master key from which other security keys for use in communications with the UE 302 may be derived and/or a sequence number value. The master key may be the key $K_{ASME}$, such as may be used in accordance with E-UTRAN telecommunications standards. The sequence number value may be a stored value comprised of a plurality of bits and used to maintain a sequential count that may be automatically and/or periodically incremented, such as in response to a communication and/or handover event involving the UE 302. The UE 302 may also maintain a similar sequence number value that may have a value identical to that maintained by the MME 316 in a cached security context unless the values of the respective sequence number values fall out of synchronization, as will be described herein below. In active mode handovers, the "current sequence number value" may be the sequence number value maintained by the MME 316 and accordingly the handover controller 320 may be configured to determine the current sequence number value based upon the sequence number value maintained in the cached security context for the UE 302. In some embodiments, the sequence number value may, for example, be the NAS downlink COUNT as maintained in accordance with E-UTRAN standards.

The handover controller 320 may additionally or alternatively be configured to receive an indication of an idle mode mobility event of a UE 302. The indication of an idle mode mobility event may comprise receiving a context request message from the target system 312. The context request message may be received from a target SGSN 314 of the target system 312. The context request message may comprise a parameter indicating a sequence number value token. The handover controller 320 may be configured to parse or otherwise extract the sequence number value token from the context request message and determine the current sequence number value based upon the sequence number value token. In this regard, in idle mode mobility events the current sequence number value is the sequence number value maintained by the UE 302. The sequence number value token received from the target SGSN 314 may have previously been forwarded to the target system 312 by the UE 302. The handover controller 320 may be configured to determine the current sequence number value using a derivation function using the sequence number value token as an input. The sequence number value token may, for example, be a NAS downlink token in accordance with E-UTRAN standards. Upon receiving an indication of an idle mode mobility event, the handover controller 320 may additionally be configured to retrieve a cached security context comprising a master key, such as from memory 322, as previously described.

For both active handovers and idle mode mobility events, the handover controller 320 may be configured to derive a fresh mapped security context for the target system 312. The fresh mapped security context may comprise a plurality of security keys for use in communications with the UE 302 and/or for use in deriving additional keys for use in communications between the UE 302 by the target system 312. These security keys may comprise, for example, a cipher key (CK') and an integrity key (IK'). In this regard, the handover controller 320 may be configured to derive the fresh mapped security context using key derivation functions with the current sequence number value as an input parameter. The handover controller 320 may additionally use the master key, such as $K_{ASME}$, from the cached security context as an input parameter for the key derivation functions. Accordingly, since an incrementing sequence number value is used as an input parameter for deriving a mapped security context, the mapped security context derived by the handover controller 320 may be unique from any previously derived mapped security context even during the life of the master key.

The handover controller 320 may further be configured to provide the derived fresh mapped security context to the target system. Accordingly, for active mode handovers, the handover controller 320 may be configured to send a relocation request message comprising the derived fresh mapped security context to the target SGSN 314. Additionally or alternatively, for idle mode mobility events, the handover controller 320 may be configured to send a context response message, such as in response to the received context request message, to the target SGSN 314.

For active mode handovers, the handover controller 320 may be configured to provide an indication of the current sequence number value to the UE 302 so that the UE 302 may synchronize its sequence number value with that used by the source MME 316 so that the UE 302 may derive a corresponding mapped security context. The indication of the current sequence number value may comprise the entire current sequence number value or alternatively may comprise a predefined number of bits comprising the current sequence number value. In one exemplary embodiment, the indication of the current sequence number value may comprise the three least significant bits of the current sequence number value. The handover controller 320 may be configured to provide the indication of the current sequence number value in a handover command message that may be sent to the source evolved node-B 304. The source evolved node-B 304 may then forward a handover command message comprising the indication of the current sequence number value to the UE 302.

Referring now to the UE 302, in an exemplary embodiment, a UE 302 may include various means, such as a processor 324, a handover manager 326, and memory 328, for performing the various functions described herein. The processor 324 may be embodied as any of various processing means including a processor, a coprocessor, a controller or various other processing devices including integrated circuits such as, for example, an ASIC (application specific integrated circuit), a field programmable gate array (FPGA) and/or other suitably configured or programmed hardware and/or software elements. In some embodiments, the processor 324 may be a controller 20 of a mobile terminal 10. The handover manager 326 may be any device or means embodied in either hardware, software, or a combination of hardware and software and may, in one embodiment, be embodied as or otherwise controlled by the processor 324. In some embodiments, the memory 328 may be volatile memory 40 or non-volatile memory 42 of a mobile terminal 10.

The handover manager 326 may be configured to initiate and/or otherwise manage handover of the UE 302 from a source evolved node-B 304 to a target access point 310. Accordingly, for an active mode handover, the handover manager 326 may be configured to receive a handover command message from a source evolved node-B 304 and initiate related local handover processes in response thereto. The handover command message may include an indication of the current sequence number value. As described above, the indication may comprise, for example, the entire current sequence number value or a plurality of bits of the current sequence number value. Further, in an exemplary embodiment, the indication of the current sequence number value may indicate the current value of the NAS downlink COUNT. The handover manager 326 may be further configured to determine the current sequence number value based upon the received indication so that the sequence number value maintained and used by the handover manager 326 is synchronized with that maintained and used by the handover controller 320 of the source MME 316. In this regard, if the received indication of the current sequence number value comprises the entire current sequence number value, the handover manager 326 may be configured to use the received indication as the current sequence number value. Additionally or alternatively, if the received indication comprises only some of the bits of the current sequence number value, such as, for example, the three least significant bits, the handover manager 326 may be configured to determine the current sequence number value based upon the received indication and a sequence number value locally maintained by handover manager 326. This locally maintained sequence number value may, for example, be stored in memory 328, such as in association with cached security context information for the UE 302. Accordingly, the handover manager 326 may be configured to replace the three least significant bits of the locally maintained sequence number value with the three least significant bits of the current sequence number value comprising the received indication to determine the current sequence number value. The handover manager 326 may further be configured to use the determined current sequence number value to derive a mapped security context corresponding to that derived by the handover controller 320 of the source MME 316. Accordingly, the handover manager 326 may be configured to calculate a plurality of security keys, which may include CK' and IK', using key derivation functions with the determined current sequence number value as an input parameter.

The handover manager 326 may further be configured to initiate an idle mode mobility event of the UE 302 from the source evolved node-B 304 to a target access point 310, such as in response to a detected weak radio signal condition. Accordingly, the handover manager 326 may be configured to switch radio control to the target system 312 from the E-UTRAN system 306. The handover manager 326 may further be configured to determine the current sequence number value by retrieving a locally maintained sequence number value, such as may be stored in memory 328. The handover manager 326 may be additionally configured to derive a mapped security context using the determined current sequence number value as described above. The handover manager 326 may also be configured to send a routing area update request message to the target access point 310. The routing area update request message may comprise a sequence number value token, which in an exemplary embodiment may be a NAS downlink token. The sequence number value token may be subsequently forwarded to the source MME 316 by the target SGSN 314 of the target system 312 and used by the handover controller 320 of the source MME 316 to synchronize the MME-maintained sequence number value with that used by the handover manager 326 as previously described to derive a mapped security context corresponding to that derived by the handover manager 326.

Figure 4:
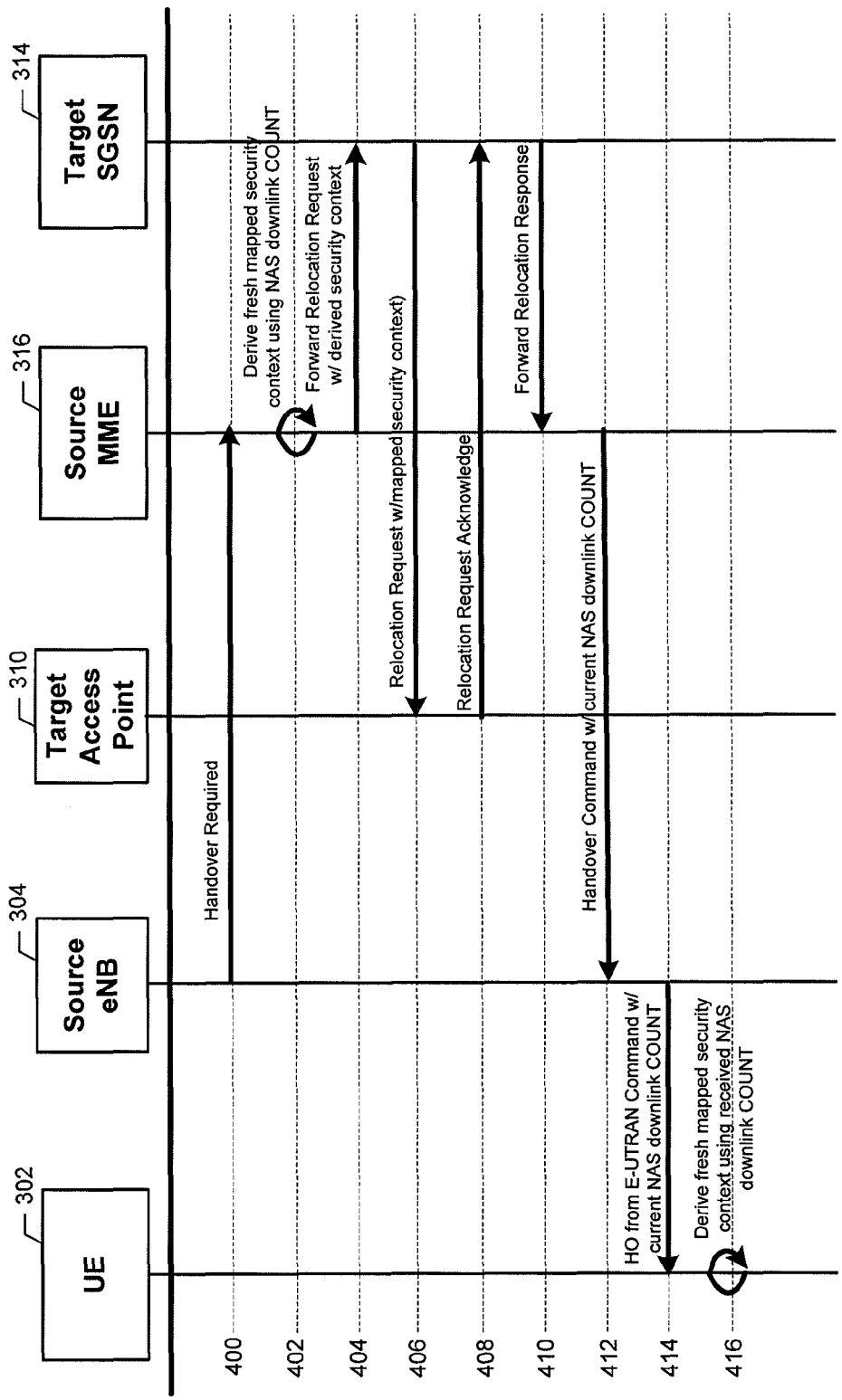
FIG. 4 is a control flow diagram of communication signals passed between entities of the exemplary embodiment of FIG. 3 during an active mode handover process according to an exemplary embodiment of the present invention.

FIG. 4 is a control flow diagram of communication signals passed between entities of the exemplary embodiment of FIG. 3 as well as operations performed by the entities during an active mode intersystem mobility handover process according to an exemplary embodiment of the present invention. In this exemplary embodiment, the UE 302 is handed over from an E-UTRAN system to a target system using another communications standard, such as GERAN or UTRAN. Operation 400 may comprise the source evolved node-B 304 sending a handover required message to the source MME 316. The handover controller 320 of the source MME 316 may then determine the current NAS downlink COUNT of a security context maintained in the E-UTRAN system and derive a fresh mapped security context using the determined current NAS downlink COUNT at operation 402. Operation 404 may comprise the handover controller 320 of the source MME 316 forwarding a relocation request message comprising the derived fresh mapped security context to the target SGSN 314. The target SGSN 314 may then forward the relocation request message with derived fresh mapped security context to the target access point 310 at operation 406. Operation 408 may comprise the target access point 310 sending a message to the target SGSN 314 acknowledging receipt of the relocation request. Operation 410 may comprise the target SGSN 314 sending a forward relocation response message acknowledging the relocation to the source MME 316. The handover controller 320 of the source MME 316 may then send a handover command message comprising an indication of the current NAS downlink COUNT value to the source evolved node-B 304 at operation 412. The source evolved Node-B 304 may then send a handover from E-UTRAN command comprising the indication of the current NAS downlink COUNT value to the UE 302 at operation 414. Operation 416 may comprise the handover manager 326 of the UE 302 determining the current NAS downlink COUNT value based upon the indication received in the handover command and deriving a fresh mapped security context corresponding to that derived by the source MME 316 using the determined current NAS downlink COUNT.

FIG. 5 is a control flow diagram of communication signals passed between entities of the exemplary embodiment of FIG. 3 as well as operations performed by the entities during an idle mode intersystem mobility process according to an exemplary embodiment of the present invention. In this exemplary embodiment, the UE 302 is switching from an E-UTRAN system to a target system using another communications standard, such as GERAN or UTRAN. Operation 500 may comprise the UE 302 switching from the E-UTRAN system 306 to a target system 312, which may be, for example, a UTRAN or GERAN system, at the command of the handover manager 326. Accordingly, operation 500 may further comprise the handover manager 326 calculating a fresh mapped security context based upon the current NAS downlink COUNT maintained by the handover manager 326. Operation 502 may comprise the handover manager 326 sending a routing area update request massage comprising the NAS downlink token to the target access point 310. The target access point 310 may then forward the routing area update request message to the target SGSN 314 at operation 504. Operation 506 may comprise the target SGSN 314 sending a context request message comprising the NAS downlink token to the source MME 316. The handover controller 320 of the MME 316 may then calculate the current NAS downlink COUNT using the received NAS downlink token at operation 508. Operation 508 may further comprise the handover controller 320 deriving a fresh mapped security context corresponding to that derived by the handover manager 326 based upon the calculated current NAS downlink COUNT. Operation 510 may comprise the handover controller 320 sending a context response message comprising the derived fresh mapped security context to the target SGSN, which may then acknowledge receipt of the context response at operation 512.

FIGS. 6-9 are flowcharts of a system, method and program product according to exemplary embodiments of the invention. It will be understood that each block or step of the flowcharts, and combinations of blocks in the flowcharts, may be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal or of another network entity, such as, for example, an SGSN or MME, and executed by a processor in the mobile terminal and/or a processor of another network entity, such as, for example, an SGSN or MME. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that may direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, may be implemented by special purpose hardware-based computer systems which perform the specified functions or steps, or combinations of special purpose hardware and computer instructions.

Figure 6:
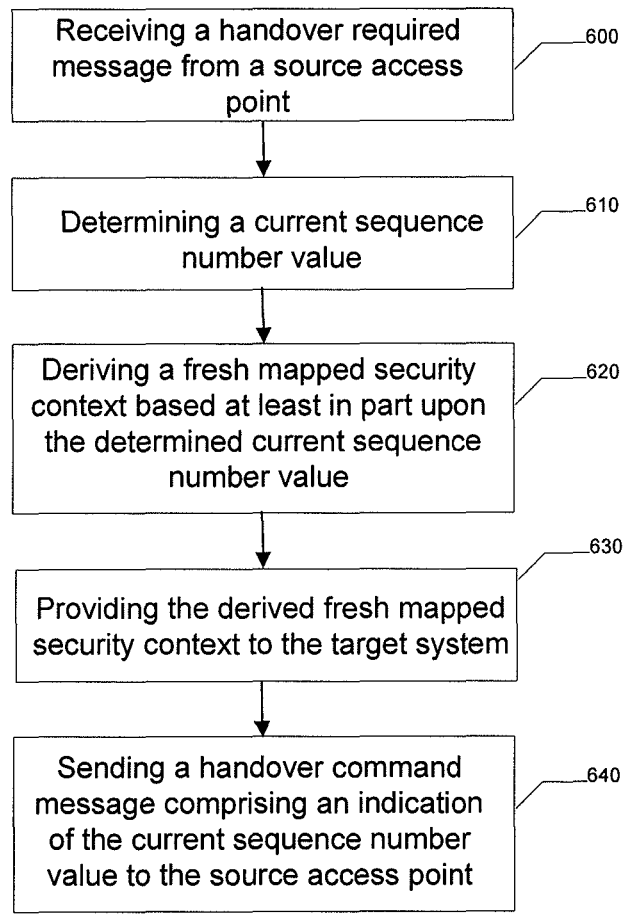

FIG. 6 illustrates one embodiment of a method for providing a fresh security context during intersystem mobility, illustrating operations that may occur at a signaling gateway, such as, for example, an SGSN or a mobility management entity (MME), during an active mode handover process according to an exemplary embodiment of the present invention. In this regard, one embodiment of the method illustrated in FIG. 6 includes the handover controller 320 of the MME 316 receiving a handover required message from a source access point, such as a source evolved node-B 304, at operation 600. The handover controller 320 may then determine a current sequence number value of a security context maintained in the source system at operation 610. Operation 620 may comprise the handover controller 320 deriving a fresh mapped security context based at least in part upon the determined current sequence number value. Operation 630 may comprise the handover controller 320 providing the derived fresh mapped security context to the target system, such as by sending a relocation request message comprising the derived fresh mapped security context to the target SGSN 314. Operation 640 may comprise the handover controller 320 sending a handover command message comprising an indication of the current sequence number value to the source access point.

Figure 7:
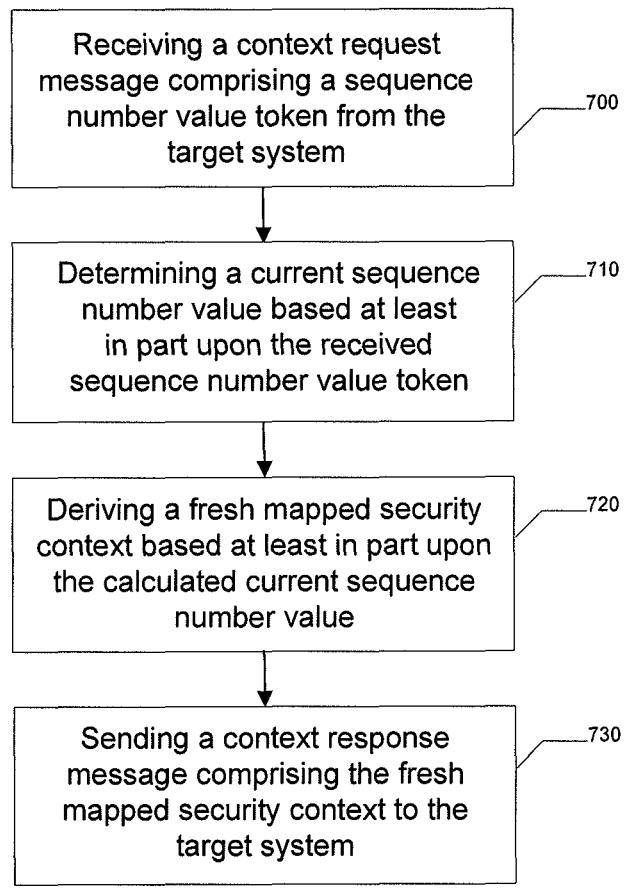

FIG. 7 illustrates one embodiment of a method for providing a fresh security context during intersystem mobility, illustrating operations that may occur at a signaling gateway, such as, for example, an SGSN or a mobility management entity (MME), during an idle mode mobility event according to an exemplary embodiment of the present invention. In this regard, one embodiment of the method illustrated in FIG. 6 includes the handover controller 320 of the MME 316 receiving a context request message comprising a sequence number value token from the target system 312 at operation 700. In this regard, for example, the handover controller 320 may receive the context request message from a target SGSN 314. Operation 710 may comprise the handover controller 320 determining a current sequence number value, such as by calculating the current sequence number value based at least in part upon the received sequence number value token. Operation 720 may comprise the handover controller 320 deriving a fresh mapped security context based at least in part upon the calculated current sequence number value. The handover controller 320 may then send a context response message comprising the fresh mapped security context to the target system 312 at operation 730. In this regard, for example, the handover controller 320 may send the context response message to the target SGSN 314.

Figure 8:
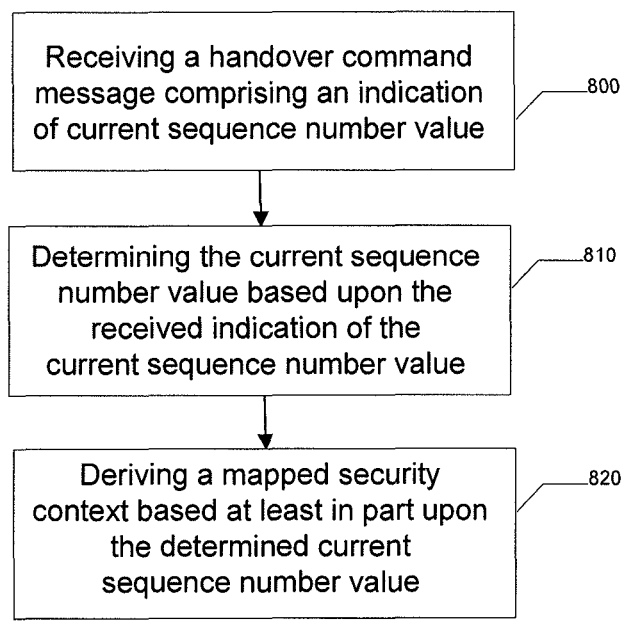

FIG. 8 illustrates one embodiment of a method for providing a fresh security context during intersystem mobility. In this regard, FIG. 8 illustrates operations which may occur at a UE 302 during an active mode handover process according to an exemplary embodiment of the invention. The method may include the handover manager 326 receiving a handover command message comprising an indication of the current sequence number value from an access point, such as a source evolved node-B 304, at operation 800. Operation 810 may comprise the handover manager 326 determining the current sequence number value based upon the received indication of the current sequence number value. The handover manager 326 may then derive a mapped security context based at least in part upon the determined current sequence number value.

Figure 9:
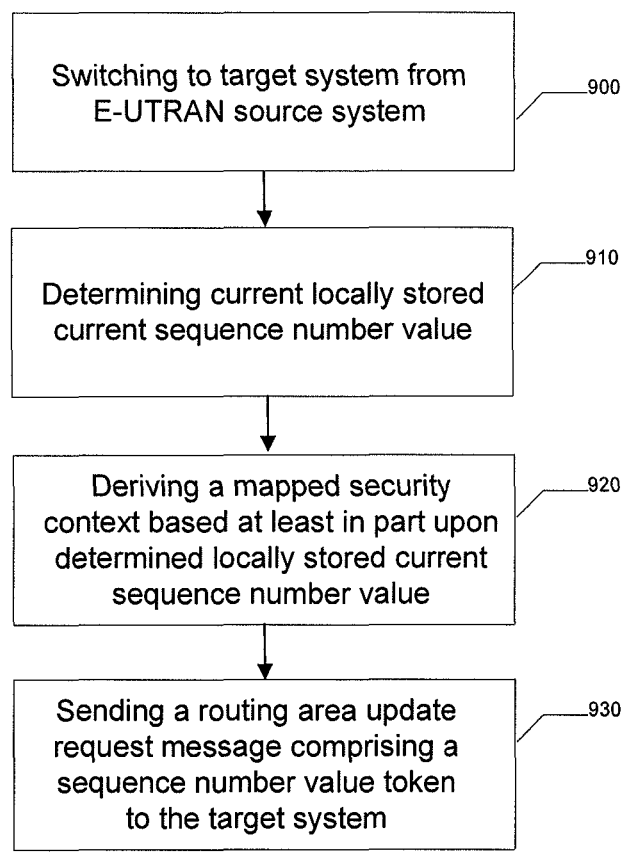

FIG. 9 illustrates one embodiment of a method for providing a fresh security context during intersystem mobility. In this regard, FIG. 8 illustrates operations which may occur at a UE 302 during an idle mode mobility event according to an exemplary embodiment of the invention. The method may include the handover manager 326 switching to the target system 312 from the E-UTRAN source system 306 at operation 900. Operation 910 may comprise the handover manager 326 determining a current locally stored current sequence number value. Operation 920 may comprise the handover manager 326 deriving a mapped security context based at least in part upon the determined locally stored current sequence number value. The handover manager 326 may then send a routing area update request message comprising a sequence number value token to the target system at operation 930. In this regard, the handover manager 326 may, for example, send the routing area update request message to a target access point 310.

The above described functions may be carried out in many ways. For example, any suitable means for carrying out each of the functions described above may be employed to carry out the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Accordingly, embodiments of the present invention may provide a fresh mapped security context to a target system during intersystem mobility. The fresh mapped security context may be derived by deriving security keys provided to the target system based at least in part upon an incrementing sequence number value maintained by both a UE and an MME during the life of the master key maintained in the cached security context for the UE. Accordingly, embodiments of the present invention may prevent key stream reuse that may otherwise occur, for example when a UE is handed over back and forth between an E-UTRAN and a UTRAN or GERAN system multiple times during the life of the master key $K_{ASME}$ that may be maintained in a cached security context by the E-UTRAN.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A non-transitory computer-readable storage medium with instructions that, when executed by at least one processor, provides operations comprising:

receiving, at a network element, an indication of a handover of a remote device from a source system to a target system, wherein the target system implements a communications standard different from the source system;

determining, at the network element, a sequence value of a security context maintained in the source system;

deriving, at the network element, another security context for the target system based at least in part on the determined sequence value; and providing, by the network element, the other security context to the target system, wherein the source system implements an evolved universal terrestrial radio access network communications standard, wherein the determining comprises determining a non-access stratum downlink count, and wherein the deriving comprises calculating a cipher key and an integrity key based at least in part upon the determined non-access stratum downlink count.

2. The non-transitory computer-readable storage medium of claim 1, wherein the handover comprises an active mode handover of the remote device.

3. The non-transitory computer-readable storage medium of claim 2, wherein the receiving comprises receiving a handover required message from a source access point, and wherein the operations further comprise sending a handover command message comprising an indication of the determined sequence value to the source access point.

4. The non-transitory computer-readable storage medium of claim 3, wherein the sending comprises sending the handover command message comprising a first parameter indicating a predefined number of least significant bits of the determined sequence value or a second parameter indicating every bit of the determined sequence value.

5. The non-transitory computer-readable storage medium of claim 1, wherein the receiving comprises receiving a first indication of an idle mode mobility event of the remote device.

6. The non-transitory computer-readable storage medium of claim 5, wherein the receiving comprises receiving a context request message from a target serving general packet radio service support node, and wherein the context request message comprises a sequence value token provided to the target system by the remote device.

7. The non-transitory computer-readable storage medium of claim 6, wherein the determining comprises calculating the sequence value based at least in part upon the received sequence value token.

8. An apparatus comprising:
at least one processor; and
at least one memory, wherein the at least one processor and the at least one memory are configured to at least:
receive, at the apparatus, an indication of handover of a remote device from a source system to a target system, wherein the target system implements a communications standard different from the source system;
determine, at the apparatus, a sequence value of a security context maintained in the source system;
derive, at the apparatus, another security context for the target system based at least in part on the determined sequence value; and
provide, by the apparatus, the other security context to the target system,
wherein the source system implements an evolved universal terrestrial radio access network communications standard, wherein the determine comprises determining a non-access stratum downlink count, and wherein the derive comprises calculating a cipher key and an integrity key based at least in part upon the determined non-access stratum downlink count.

9. The apparatus according to claim 8, wherein the indication comprises an indication of an active mode handover of the remote device.

10. The apparatus according to claim 9, wherein a handover required message is received from a source access point, and wherein a handover command message comprising the determined sequence value is sent to the source access point.

11. The apparatus according to claim 10 wherein the handover command message comprising a first parameter indicates a predefined number of least significant bits of the determined sequence value or a second parameter indicating every bit of the determined sequence value.

12. The apparatus according to claim 8 wherein the indication representative of an idle mode mobility event of the remote device.

13. The apparatus according to claim 12, wherein a context request message is received from a target serving general packet radio service support node, and wherein the context request message comprises a sequence value token provided to the target system by the remote device.

14. The apparatus according to claim 13, wherein the sequence value is determined by at least calculating the sequence value based at least in part on the received sequence value token.

15. A method comprising:
receiving, at a network element, an indication of handover of a remote device from a source system to a target system, wherein the target system implements a communications standard different from the source system;
determining, at the network element, a sequence value of a security context maintained in the source system;
deriving, at the network element, another security context for the target system based at least in part on the determined sequence value; and
providing, by the network element, the other security context to the target system,
wherein the source system implements an evolved universal terrestrial radio access network communications standard, wherein the determining comprises determining a non-access stratum downlink count, and wherein the deriving comprises calculating a cipher key and an integrity key based at least in part upon the determined non-access stratum downlink count.

16. The method according to claim 15, wherein the indication comprises an indication of an active mode handover of the remote device.

17. The method according to claim 16, wherein the receiving comprises receiving a handover required message from a source access point, and wherein the operations comprise sending a handover command message comprising an indication of the determined sequence value to the source access point.

18. The method according to claim 16, wherein the sending comprises sending the handover command message comprising a first parameter indicating a predefined number of least significant bits of the sequence value or a second parameter indicating every bit of the sequence value.

19. The method according to claim 15, wherein the indication comprises an indication of an idle mode mobility event of the remote device.

20. The method according to claim 19, wherein the receiving comprises receiving a context request message from a target serving general packet radio service support node, and wherein the context request message comprises a sequence number value token provided to the target system by the remote device.

21. The method according to claim 20, wherein the determining comprises calculating the current sequence value based at least in part upon the received sequence number value token.

* * * * *